Patented Aug. 21, 1934

1,971,042

UNITED STATES PATENT OFFICE 1,971,042

PROCESS FOR THE PHOTOCHEMICAL OXIDATION OF ORGANIC AND INORGANIC COMPOUNDS

Ignaz Kreidl, Vienna, Austria

No Drawing. Application July 1, 1932, Serial No. 620,549. In Austria July 21, 1931

6 Claims. (Cl. 260—108)

This invention relates to a process for the photochemical oxidation of organic and inorganic compounds.

Processes for the photochemical oxidation of organic and inorganic compounds, by irradiation in presence of oxygen and under the influence of a catalyst are known. Anthraquinone has been employed as a catalyst, and the advantage of a catalyst of the anthraquinone type has been assumed to reside in the fact that it does not itself, undergo any alteration during the reaction, and, therefore, acts as a true catalyst.

It has, however, transpired that when anthraquinone is employed as catalyst, the oxidation is accompanied by condensation phenomena, with the result that the desired oxidation product is not obtained in a pure state. Attempts have already been made to obviate this inconvenience by allowing the catalysis, initiated by the presence of substances of the anthraquinone type to proceed in conjunction with the assistance of catalysts (promoter catalysts) of a different kind.

The present invention is based on the discovery that catalysts other than those of the anthraquinone type are to be preferred, namely, the following catalysts or groups of catalysts:

(a) Hydrocarbons with a ring system containing at least three condensed nuclei, e. g. benzene nuclei, such more particularly, as anthracene, di- or poly-anthracenes, and also the substitution products of these hydrocarbons, especially quinonoid derivatives or substances adapted to become transformed into quinonoid derivatives of these hydrocarbons, for example by oxidation.

(b) The hydrogenated products of the substances specified under a, including the hydrogenation products of anthraquinone or of the substances of the anthraquinone type and their substitution products, and especially the substances specified under a and b in association with one or more promoter catalysts if desired.

(c) Mixtures of the substances specified under a and b and if desired, also in conjunction with one or more promoter catalysts.

By comparison with the catalysts of the anthraquinone type, those specified above have the advantage of preventing or at least considerably suppressing condensation and other reaction phenomena, so that promoter catalysts are unnecessary though they are not precluded from application in the present invention.

For carrying out the hereindescribed process, such substances also come naturally under consideration as catalysts as are transformable or convertible, for example, by oxidation, into anthraquinone or substances which may be considered as derivatives or substitution products of anthraquinone, for example, naphthanthraquinone, indanthrene, flavanthrene, pyranthrone, or into the oxidation products thereof; the lower stages of oxidation of anthraquinone, or substances of the anthraquinone type or substances transformable into the lower stages of oxidation of anthraquinone or substances of the anthraquinone type being more preferable to the stages of oxidation corresponding to anthraquinone or substances of the anthraquinone type.

Substances that can be successfully employed for carrying out the hereindescribed process are those which are of the quinonoid type and represent lower stages of oxidation of anthraquinone or substances of anthraquinone type, for example, anthrone, oxanthrone and the like or substances that are transformable (for example, by oxidation) into such substances of quinonoid type.

Suitable promoter catalysts comprise both alkaline, reaction accelerators (OH-ions) such as soda lye, potash lye, milk of lime, and the like, also adsorption catalysts such as carbon or gels such as silica gel and the like. Metallic salts and oxides also come under consideration, and particularly both inorganic and organic salts of for example, copper, bismuth, iron, vanadium and silver.

These promoter catalysts may be employed conjointly in any desired number, for example, metallic salts or oxides in association with alkaline, reaction accelerators, or with adsorption catalysts and the like.

*Examples*

(1) For the purpose of photo-oxidation, toluene is saturated with anthracene, as catalyst and floated on soda lye. Exposure to light in an atmosphere of oxygen furnishes benzoic acid.

(2) Ethyl alcohol is saturated with anthrone-sulphonic acid. On exposure to light in an atmosphere of oxygen, acetaldehyde is formed.

(3) Fermentation amyl-alcohol is saturated with dihydro-anthracene and floated on soda lye. On exposure to light in an atmosphere of oxygen, isovaleric acid is formed.

(4) Petroleum is saturated with anthrone and dihydrodianthrone, and floated on a solution of sodium carbonate. On exposure to light in an atmosphere of oxygen, a mixture of fatty soaps is obtained.

What I claim is:

1. A process for photochemical oxidation which comprises subjecting the compound to be oxidized to irradiation in the presence of oxygen and in the presence of a catalyst selected from the following group: hydrocarbons with a ring-system containing at least three condensed nuclei; substitution products of such hydrocarbons; substances of quinonoid type with a ring system containing at least three condensed nuclei and which are of a lower stage of oxidation with respect to at least one of the quinonoid carbon atoms than corresponds to anthraquinone and substitution products of such substances; hydrogenated products of hydrocarbons with a ring-system containing at least three condensed nuclei and substitution products of such last-mentioned hydrocarbons.

2. A process according to claim 1 wherein the catalyst is a hydrocarbon with a ring-system containing at least three condensed benzene nuclei.

3. A process according to claim 1, wherein the catalyst is an anthracene.

4. The process according to claim 1, wherein the catalyst is an anthracene substitution product.

5. The process according to claim 1, wherein the catalyst is employed together with any known catalyst capable of promoting photochemical oxidation.

6. The process according to claim 1 wherein the catalyst is a nuclear-hydrogenated product of substances selected from the following group: anthraquinone, derivatives of anthraquinone and substitution products of either.

IGNAZ KREIDL.